Jan. 30, 1934.  J. SNEED  1,945,166

BRAKE MECHANISM

Filed Aug. 6, 1925  3 Sheets-Sheet 1

INVENTOR.
JOHN SNEED

BY Rex Frye.

ATTORNEY.

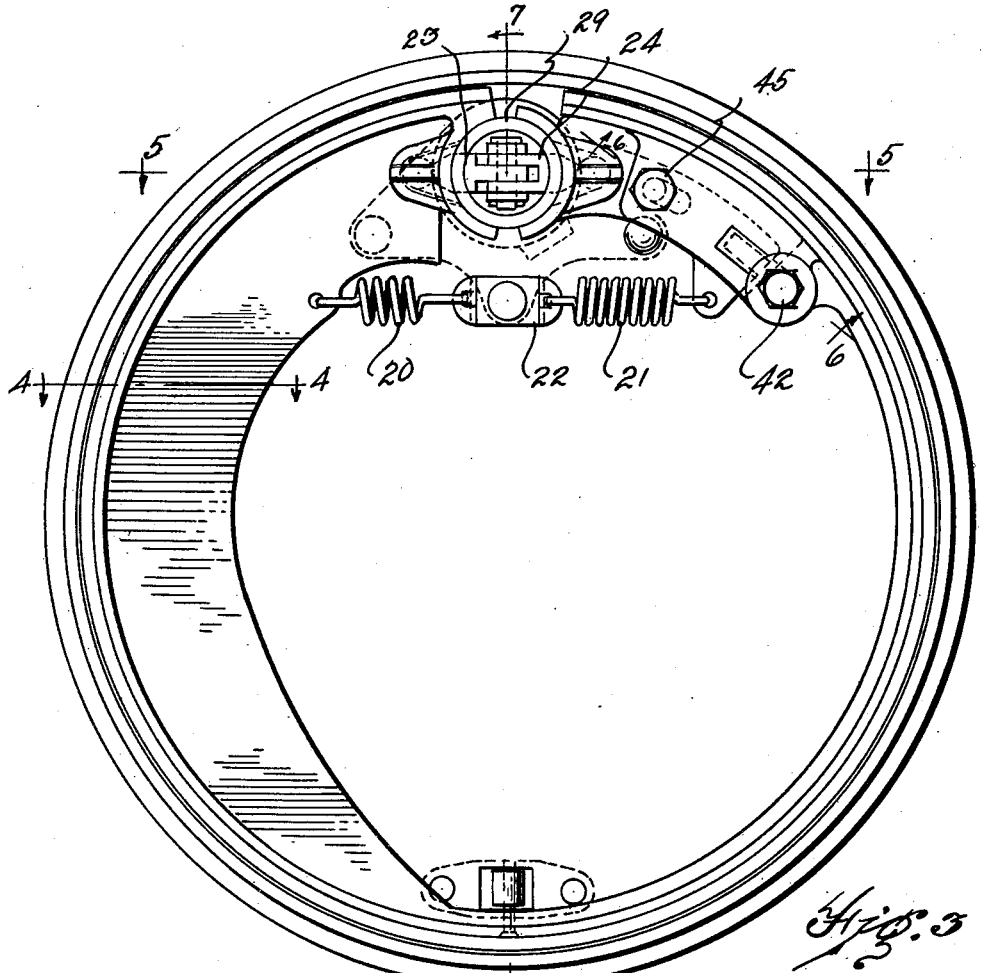

Jan. 30, 1934. J. SNEED 1,945,166
BRAKE MECHANISM
Filed Aug. 6, 1925 3 Sheets-Sheet 3
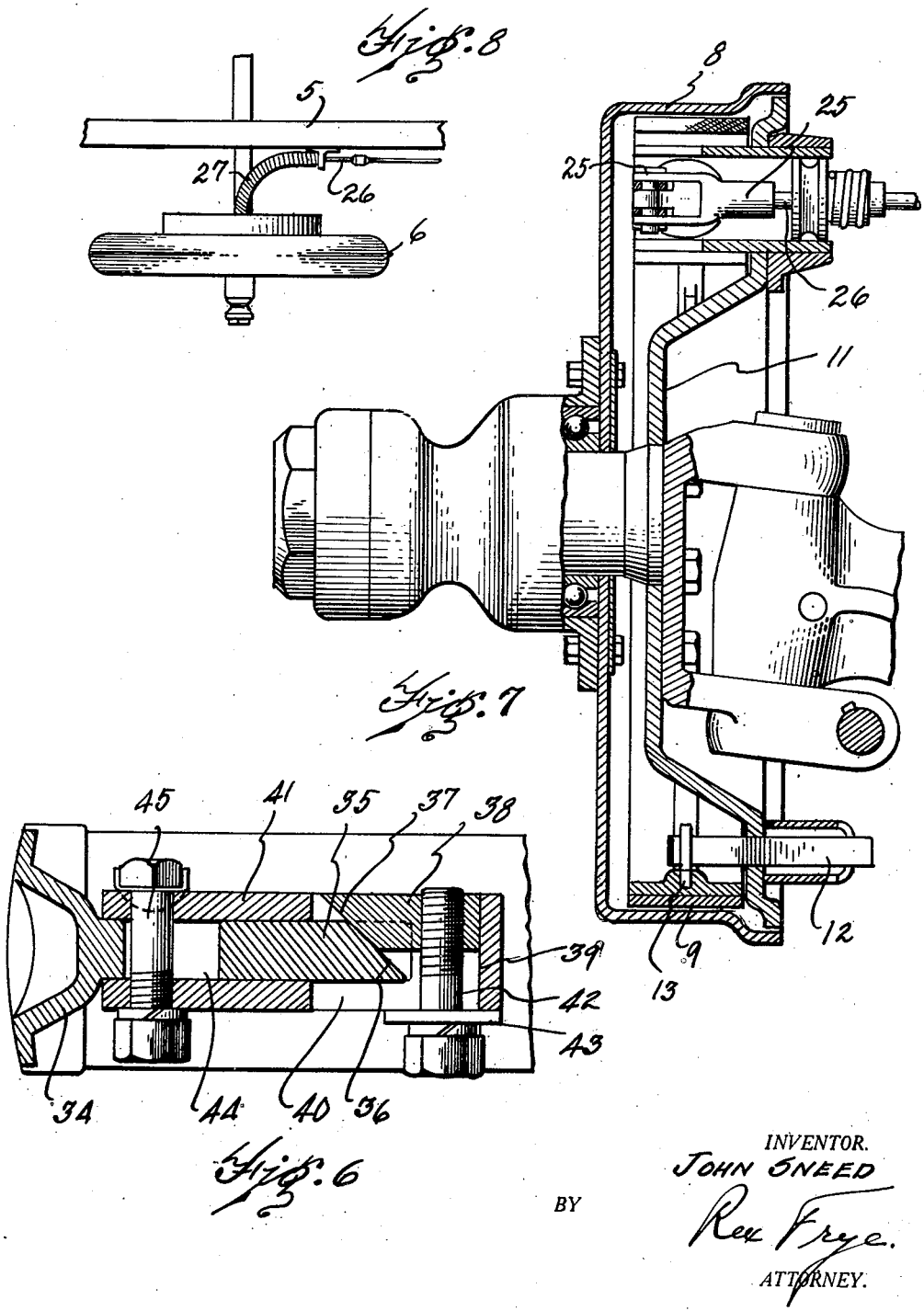

Patented Jan. 30, 1934

1,945,166

UNITED STATES PATENT OFFICE 1,945,166

BRAKE MECHANISM

John Sneed, Detroit, Mich., assignor to Steeldraulic Brake Corporation, Detroit, Mich., a corporation of Michigan Application August 6, 1925. Serial No. 48,470

26 Claims. (Cl. 188—78)

This invention relates to brakes for automobiles and other vehicles, and has for its principal object the provision of a simple and positive braking mechanism whereby the brakes will be gradually applied with increasing force.

Another object of this invention is the arrangement of a brake shoe with a flexible portion and a rigid portion whereby the braking resistance is multiplied thru the flexible portion and then transmitted to the rigid portion.

A further object of the invention is the construction of a brake shoe comprising an integral piece shaped as a divided annulus and having a portion not exceeding one-half of its circumference formed so as to be flexible and the remaining portion of the circumference braced by an integral rib so that it will be substantially rigid.

Other objects and advantages will be apparent from the following description, wherein reference is made to the accompanying drawings illustrating preferred embodiments of my invention and wherein similar reference numerals designate similar parts throughout the several views.

In the drawings:

Fig. 3 is a side elevation of a slightly modified embodiment of my invention.

Fig. 5 is a horizontal section taken substantially on the line 5—5 of Fig. 3.

Fig. 6 is an enlarged detail section taken substantially on the line 6—6 of Fig. 3.

Fig. 7 is a central vertical section taken substantially on the line 7—7 of Fig. 3 and showing an elevation of adjacent mechanism associated with my improved brake mechanism, and Fig. 8 is a detail plan view of one wheel and a portion of the chassis of an automobile, and showing the manner of mounting my improved brake mechanism and its actuating means.

Figure 1:
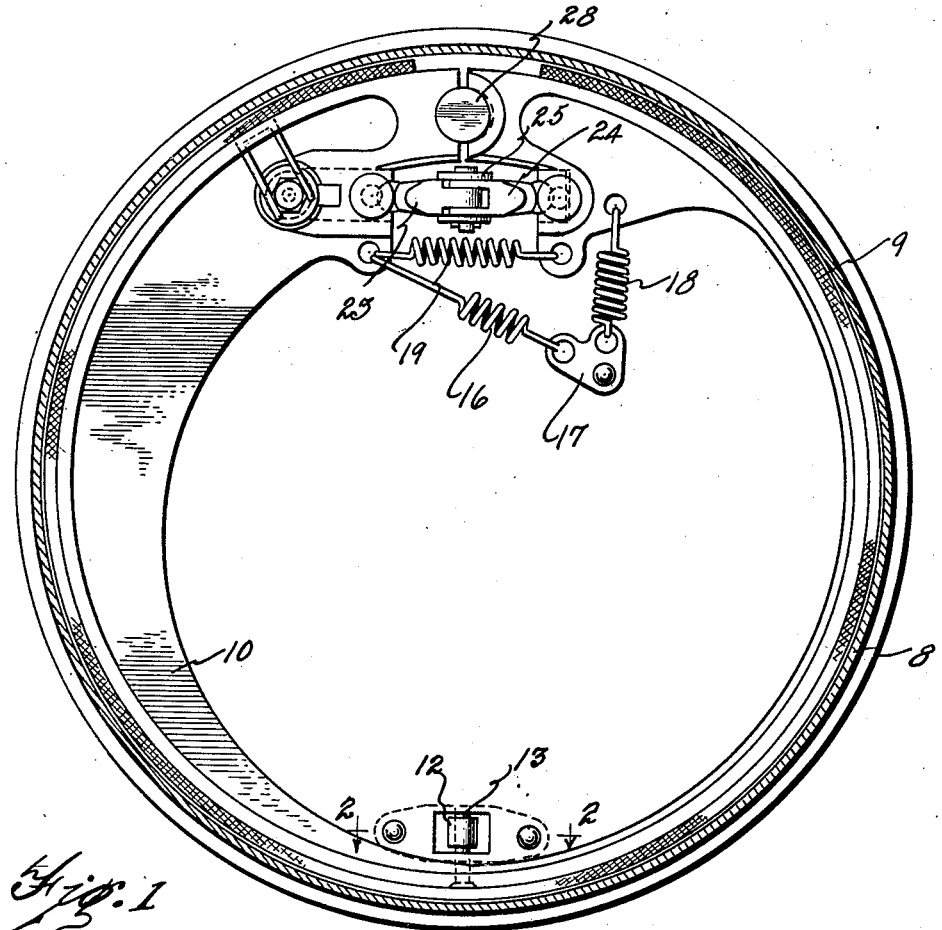
Fig. 1 is a vertical sectional view through a vehicle brake constructed in accordance with my invention.

Referring now to the drawings, the numeral 5 designates the chassis of an automobile (note Fig. 8), and 6 one of the wheels thereof to which is secured a brake drum 8. Inasmuch as these parts may be the usual or of any desired construction, no attempt has been made herein to illustrate a completely operative brake actuating mechanism, only so much of the vehicle parts being shown as is necessary to delineate the action of the brake mechanism forming the claimed disclosure herein. The brake drum 8 is herein shown as adapted for use with an outwarding expanding brake shoe 9 adapted to contact the inner periphery of the brake drum, but it will be understood that other forms of brake drum and other applications of the brake mechanism herein shown may also be employed.

The subject matter of the present application is a continuation in part of my companion application, Serial No. 2,715, filed January 16, 1925, in that developments from the original disclosure in said application are shown and described herein. The embodiment illustrated in Fig. 1 of this application is divided out of my above mentioned application, while the embodiment illustrated in Fig. 3 is a development from the original disclosure in the above mentioned application. The brake shoe 9 is preferably formed as a one-piece divided annulus having a portion substantially flexible and the remaining portion of the brake shoe stiffened by a rib 10 so as to render it substantially rigid. The relative extents of the flexible and rigid portions may be varied as desired, but preferably the rigid portion does not exceed one-half of the circumference of the brake shoe. The purpose of the flexible portion is to enable the gradual application of the brake shoe to the brake drum with increasing force, the movement of the brake actuating mechanism first forcing the adjacent extremity of the flexible portion against the brake drum, and then the turning moment of the brake drum is utilized to multiply the gripping action of the flexible portion of the brake shoe and transmit this increased power to the extremity of the rigid portion of the brake shoe opposite to that engaged by the brake actuating mechanism. The result is that when the brakes are first set only a relatively small portion of the brake surface is thrown into contact with the brake drum, and such braking surface is gradually increased by the rotation of the brake drum until the entire rigid portion of the brake shoe is moved as a unit into engagement with the brake drum. By varying the relative extents of the flexible and rigid portions of the brake shoe different graduations of the pressure application can be secured.

Figure 2:
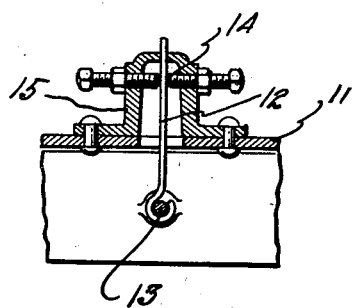
Fig. 2 is a detail sectional view taken substantially on the line 2—2 of Fig. 1.

The brake shoe 9 is herein shown as a full-floating brake shoe, the only connection with the rigid brake housing 11 being through the leaf spring 12 secured at one extremity to a pin 13 extending radially inwardly from the brake shoe and being clamped adjacent its other extremity by means of set screws 14 adjustably mounted in the bracket 15 carried by the brake housing (note Fig. 2). The brake shoe is thus capable of limited movement circumferentially against the tension of the spring 12, during the braking action, and, when the braking action has terminated, the spring 12 aids in returning the brake shoe to its normal position. The leaf spring 12 is preferably located substantially diametrically opposite the divided ends of the brake shoe and a plurality of coil springs may be employed to normally maintain the divided ends of the brake shoe away from the brake drum. Thus, in Fig. 1 is shown a coil spring 16 connecting the rigid end of the brake shoe with a bracket plate 17 fixed upon the inner face of the brake housing plate 11, and a coil spring 18 connecting the flexible end of the brake shoe with the bracket plate 17, while a third spring 19 directly connects the flexible and rigid extremities of the brake shoe so as to draw them toward each other. With this arrangement the brake shoe is not only contracted through the action of the spring 19, but also the ends thereof are drawn radially inward to normally space them from the brake drum. In Fig. 3 I have shown only two coil springs 20 and 21 each connecting one extremity of the brake shoe to a bracket plate 22 fixed upon the brake housing, whereby the ends of the brake shoe are drawn toward each other and away from the brake drum.

The means for actuating the brake shoes whenever desired comprises a pair of toggle levers 23 and 24 having their outer extremities seated within cups 34 carried by the divided ends of the brake shoe and pivotally connected at their inner extremities to each other and to a yoke 25 by means of which connection is made to a flexible cable 26 or other means for transmitting power from a brake pedal or lever. The flexible cable 26 preferably extends through a flexible conduit 27 arranged between the brake housing 11 and the chassis adjacent each wheel (note Fig. 8), and suitable connections are interposed between the flexible cables of the several wheels and a single brake pedal or lever so that the brakes on the several wheels are simultaneously actuated to the desired extent. In the modificaton illustrated in Fig. 1, I have shown the toggle levers 23 and 24 arranged radially inward of an anchor pin 28 against which either end of the brake shoe is adapted to engage to limit the relative rotation of the brake shoe with the brake drum when the brakes are first applied. In the embodiment illustrated in Figs. 3, 5 and 7, however, I have shown the toggle levers substantially in horizontal alignment with the axis of a hollow anchor pin 29, which hollow anchor pin serves a dual purpose of limiting the rotative movement of the brake shoe when the brakes are first applied and of guiding the flexible cable 26 and yoke 25 when the brakes are being actuated. Moreover, the arrangement of the toggle levers in substantially the same plane as the axis of the anchor pin enables the application of power to the divided ends of the brake shoe closely adjacent the periphery of the brake shoe, whereby the desired braking effect may be obtained with a comparatively lighter touch upon the brake pedal or brake lever utilized to actuate the brake mechanism. The hollow anchor pin 29 is also utilized for securing the outer extremities of the flexible conduits 27, as by fitting the outermost link 31 of the conduit within the inner extremity of the anchor pin, and providing a circular groove 30 therein for the reception of the rounded end of the set screw 32 threaded through the anchor pin and a bracket 33 carried by the brake housing. This construction enables the use of a single screw 32 to both lock the anchor pin in position on the housing and to secure the flexible conduit 27 against endwise movement while permitting it to oscillate within the anchor pin during vibrations of the vehicle.

The adjacent extremities of both the rigid and flexible sections of the brake shoe are provided with notches for the reception of the adjacent portions of the anchor pins 28 and 29 whenever the ends of the brake shoe are in engagement with the anchor pins, whereby the extremities of the brake shoe are prevented from moving radially outward toward the brake drum because of strains transmitted through the brake actuating means. By shaping the notches to substantially conform with the contour of the anchor pins the lower walls of the notched portions will engage the under surface of the anchor pin and resist any tendency of relative movement upon the anchor pin under stress.

Various means may be utilized for adjusting the initial position of the brake shoe 9 relatively to the brake drum. As best shown in Figs. 3 and 6, I prefer to mount one of the cups for the toggle levers so that it can be circumferentially adjusted upon one of the ends of the brake shoe. Thus, the cup 34 carried by the flexible extremity of the brake shoe may be formed with a shank 35 having a beveled rear extremity 36 adapted to bear against the inclined face 37 of a wedge block 38 arranged with its opposite face in sliding engagement with the rear wall 39 of a slot 40 formed in the spaced ribs 41 extending inwardly from the brake shoe. A set screw 42 threads within the wedge block 38 and engages a washer 43 bearing against one rib 41 as an anchor so that the rotation of the screw in the proper direction will move the wedge block transversely across the rear wall 39 of the slot 40 to force the shank 35 of the cup 34 away from the wall 39. A bolt 45 connects the opposite extremties of the ribs 41 and passes through an elongated slot 44 in the shank 34 of the cup, whereby the ribs are sufficiently strengthened while permitting the longitudinal movement of the shank 35. Whenever the set screw 42 is rotated in the opposite direction the inclined face 37 of the wedge block 38 will move away from the beveled face of the shank 35, and the pressure of the toggle lever against the cup 34 will move the shank 35 to again engage the wedge block 38.

The operation of my improved brake mechanism is believed to be apparent. Whenever the brake pedal or lever (not shown) is actuated a pull is exerted upon each of the flexible cables 26 so as to move the toggle levers 23 and 24 of each brake toward straightened positions, and the ends of each brake shoe are forced apart and into engagement with the brake drum. Since the coil spring connecting the rigid extremity of the brake shoe to the brake housing is of greater strength than the coil spring connecting the flexible end of the brake shoe to the brake housing, and the rigid portion must act as a unit while the flexible portion of the brake shoe can bend intermediate its ends, the flexible extremity of the brake shoe will more firmly engage the brake shoe when the brakes are first applied. The rotation of the brake drum then tends to move the brake shoe with it in its rotation, but the rotation of the brake shoe is limited by the engagement of the rigid extremity of the brake shoe with the anchor pin, and so the rotation of the brake drum serves to move the flexible portion of the brake shoe further away from the rigid extremity thereof and in so doing increases the frictional resistance of the brake shoe. The continued rotation of the brake drum serves to bring the entire flexible portion of the brake shoe into engagement with the brake drum and then the movement is transmitted to the extremity of the rigid portion of the brake shoe opposite that engaging the anchor pin, whereupon the entire rigid portion of the brake shoe is moved as a unit into engagement with the brake drum. It will be evident that a gradually increasing braking effect is secured by this construction that will first slow up and then stop the rotation of the brake drum and the wheel attached thereto. When the brake pedal or lever is released, the leaf spring 12 and the coal springs connected to the divided extremities of the brake shoe serve to draw the brake shoe away from the brake drum and return it to its normal position.

Figure 4:
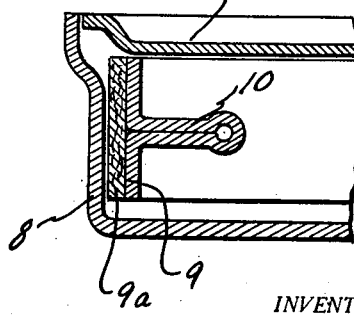
Fig. 4 is a detail cross section taken substantially on the line 4—4 of Fig. 3.

While the brake shoe may be cast or otherwise formed, I prefer to form it by a series of stamping operations from a single piece of metal. Figs. 3 and 4 show a brake shoe formed from such stamping operations, the rib 10 being made of two layers of material abutting each other and having a reinforcement at their junction (note Fig. 4). The peripheral portion 9 of the brake shoe adjacent the ribbed portion is likewise formed of two aligned parts to the face of which the brake lining 9ª is suitably secured.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim

1. In combination with the frame and a wheel of a vehicle, a brake drum carried by the wheel, an integral brake shoe arranged within the drum and formed with a rigid portion and a flexible portion arranged so that the flexible portion will first engage the brake drum and then transmit movement to the rigid portion, and means for moving the flexible portion into and out of braking position.

2. In combination with a wheel of a vehicle, a brake drum carried by the wheel, a brake shoe arranged within the drum and formed as a divided ring having a rigid portion not exceeding one-half of the circumference of the brake shoe and the remaining portion of the circumference flexible, and means for moving the flexible portion into and out of braking position in advance of the rigid portion.

3. In combination with the frame and a wheel of a vehicle, a brake drum carried by the wheel, a face plate covering the open side of the brake drum, a brake shoe arranged within the brake drum and comprising a divided ring having substantially one-half of its circumference flexible and the remainder reinforced to render it substantially rigid, means engaging the respective ends of the brake shoe for throwing the flexible portion into braking operation, and means for flexibly securing the brake shoe to the face plate adjacent the junction of the flexible and rigid portions.

4. In combination with the frame and a wheel of a vehicle, a brake drum carried by the wheel, a face plate substantially covering the open side of the brake drum, a brake shoe arranged within the brake drum and comprising a ring cut through at one place to provide spaced ends, substantially one-half of the brake shoe comprising a flexible portion and the remainder a substantially rigid portion, an anchor pin carried by the face plate and normally engaged by the ends of the brake shoes, means engaging the ends of the brake shoe for moving said ends away from each other when desired, and resilient means arranged to normally hold the ends of the brake shoe away from the brake drum.

5. In combination with the frame and a wheel of a vehicle, a brake drum carried by the wheel, a face plate substantially covering the open side of the brake drum, a brake shoe arranged within the brake drum and comprising a ring cut through at one place to provide spaced ends, substantially one-half of the brake shoe comprising a flexible portion and the remainder a substantially rigid portion, an anchor pin carried by the face plate and normally engaged by the ends of the brake shoe, means engaging the ends of the brake shoe for moving said ends away from each other when desired, and a pair of springs connecting the respective ends of the brake shoe with the face plate for normally holding said ends away from the brake drum.

6. In combination with the frame and a wheel of a vehicle, a brake drum carried by the wheel, a face plate substantially covering the open side of the brake drum, a brake shoe arranged within the brake drum and comprising a ring cut through at one place to provide spaced ends, substantially one-half of the brake shoe comprising a flexible portion and the remainder a substantially rigid portion, an anchor pin carried by the face plate and normally engaged by the ends of the brake shoe, a pair of springs connecting the respective ends of the brake shoe with the face plate, and toggle mechanism engaging the ends of the brake shoe for separating said ends against the tension of the said springs.

7. In a brake for vehicles, a brake shoe comprising an integral annular member cut through at one place, substantially one-half of the brake shoe including one extremity being flexible and the remainder reinforced by a radial rib to render it substantially rigid, both flexible and ribbed sections being movable into engagement with the friction face of a brake drum.

8. In a brake for vehicles, a brake shoe comprising an integral annular member cut through at one place, substantially one-half of the brake shoe being flexible and the remainder reinforced by a radial rib to render it substantially rigid, the flexible and rigid portions each containing one of the ends of the brake shoe, and means for separating the ends of the brake shoe at will.

9. In combination with the frame and a wheel of a vehicle, a brake drum carried by the wheel, a face plate substantially covering the open side of the brake drum, a brake shoe arranged within the brake drum and comprising a ring cut through at one place to provide spaced ends, substantially one-half of the brake shoe comprising a flexible portion and the remainder a substantially rigid portion, a hollow anchor pin carried by the face plate and normally engaged by the ends of the brake shoe, means operable through the anchor pin for engaging the ends of the brake shoe for moving said ends away from each other when desired, and resilient means arranged to normally hold the ends of the brake shoe away from the brake drum.

10. In combination with the frame and a wheel of a vehicle, a brake drum carried by the wheel, a face plate substantially covering the open side of the brake drum, a brake shoe arranged within the brake drum and comprising a ring cut through at one place to provide spaced ends, substantially one-half of the brake shoe comprising a flexible portion and the remainder a substantially rigid portion, a hollow anchor pin carried by the face plate and normally engaged by the ends of the brake shoe, a pair of springs connecting the respective ends of the brake shoe with the face plate, toggle mechanism engaging the ends of the brake shoe for separating said ends against the tension of the said springs, and means for spreading the toggle levers operable through the anchor pin.

11. In brake mechanism for vehicles, the combination with brake shoe actuating means and a brake drum mounted to rotate with a vehicle wheel, of a brake shoe formed in relatively flexible and rigid sections, both of which sections are movable by the actuating means into contact with the brake drum, the flexible section being arranged to co-operate with the rotating brake drum to increase the pressure exerted upon the flexible section and the rigid section being arranged to limit such increase in accordance with the relative areas of the flexible and rigid sections.

12. A floating brake shoe comprising portions of different flexibility, the portion of greater flexibility being adapted to serve the portion of lesser flexibility to give a self-energizing effect, whereby the degree of self-energization inherent to the shoe depends upon the ratio of the extent of the portion of greater flexibility to the extent of the portion of lesser flexibility, and separate spring positioning means for the parts of greater and lesser flexibility, the positioning means appurtenant the more flexible portions being relatively weaker than the positioning means appurtenant the less flexible portions.

13. A floating brake shoe comprising portions of different flexibility wherein the portion of greater flexibility confers a wrapping effect when the shoe is forced into braking engagement and wherein the portion of lesser flexibility confers an unwrapping effect, when the brake applying pressure is released from the shoe, spring means for urging the less flexible portions out of braking engagement, and relatively weaker spring means for urging the more flexible portion out of braking engagement.

14. A brake shoe comprising portions of different flexibility and having great flexibility near one end and of progressively decreasing flexibility to the other end, whereby the portion or portions of great flexibility serve the portion or portions of less flexibility, and means adapted to first affect the more flexible end for urging both ends toward braking position.

15. A friction device adapted to be associated with a brake drum and having portions of different physical qualities, substantially one half the device including one extremity being characterized by the ease with which it conforms to the circle of the brake drum, the other half of the device being characterized by its resistance to a similar conformation.

16. A brake shoe of great flexibility from its mid portion to substantially one end and of progressively decreasing flexibility throughout the remainder of its working length to the other end.

17. A brake shoe having an anchor bearing surface at one end and having a substantially semi-circular portion of progressively increasing flexibility from one end to the other, and having a comparatively rigid portion at the anchor end, and a removable anchor engaging member adjustably secured to said last named end.

18. A brake shoe having an anchor bearing surface at one end and having a portion of progressively increasing flexibility in a direction extending away from that end and terminating substantially at the other end in a comparatively rigid portion having another anchor engaging device secured thereto.

19. A brake shoe having a portion of progressively increasing flexibility from substantially one end to the other, having a comparatively rigid portion at one end of the shoe, and adjusting means associated with the said rigid portion.

20. The combination of a brake drum, a friction device cooperating therewith, an anchor, an expanding means, the anchor and the expanding means being disposed between adjacent ends of the friction device and both engaging one end thereof, and a member adjustably secured to the other end of the friction device and engageable with said anchor and said expanding means.

21. The combination of a brake drum, a friction device cooperating therewith, a cylindrical anchor, and an expanding means, the anchor and the expanding means being disposed between adjacent ends of the friction device and both adapted to engage either end thereof, the ends of the friction device being provided with notches shaped to substantially conform to and fit over the cylindrical anchor.

22. The combination with a brake drum, a substantially cylindrical anchor member and an expanding means, of a brake shoe formed as a divided annulus and arranged within the brake drum with the anchor and expanding means between the separated ends of the brake shoe, the ends of the brake shoe being provided with substantially semi-cylindrical notched portions adapted to fit over adjacent portions of the anchor.

23. The combination with a brake drum, a substantially cylindrical anchor member and an expanding means, of a brake shoe formed as a divided annulus and having one extremity and adjacent section substantially flexible and the other extremity and adjacent section substantially rigid, the brake shoe being arranged within the brake drum with the anchor and expanding means between the separated ends of the brake shoe, the ends of the brake shoe being provided with substantially semi-cylindrical notched portions adapted to fit over adjacent portions of the anchor.

24. In a brake mechanism for vehicles, the combination with brake shoe actuating means and brake drums fixed upon vehicle wheels, of brake drum engaging means formed in relatively flexible and rigid sections, both of which sections are movable by the actuating means into contact with the brake drums, means resisting movement of each section into engagement with its drum, said means being so arranged that the flexible section offers less resistance to such movement than the rigid section.

25. In combination with a brake drum, a brake band having opposite similarly positioned portions expansible into engagement with the drum, one adjacent each end of the band and one of materially greater flexibility than the other, and means for urging the end including the more flexible portion of the band into engagement with the drum.

26. In combination with a brake drum, a brake band operatively associated therewith having a rigid portion adjacent one end and having a portion of materially greater flexibility adjacent and similarly positioned relatively to the other end, both said portions being expansible and contractible into and from engagement with the drum, and applying means for urging first the end adjacent the more and then that adjacent the less flexible end of the band into engagement with the drum.

JOHN SNEED.